(12) United States Patent
Gosset (10) Patent No.: US 9,616,891 B2
(45) Date of Patent: Apr. 11, 2017

(54) VEHICLE GUIDANCE SYSTEM AND CORRESPONDING METHOD

(71) Applicant: THALES, Neuilly sur Seine (FR)

(72) Inventor: Philippe Gosset, Magny-les-Hameaux (FR)

(73) Assignee: France Brevets, Paris (FR)

( * ) Notice: Subject to any disclaimer, the term of this patent is extended or adjusted under 35 U.S.C. 154(b) by 0 days.

(21) Appl. No.: 14/429,088

(22) PCT Filed: Sep. 27, 2013

(86) PCT No.: PCT/EP2013/070259
§ 371 (c)(1),
(2) Date: Mar. 18, 2015

(87) PCT Pub. No.: WO2014/056740
PCT Pub. Date: Apr. 17, 2014

(65) Prior Publication Data
US 2015/0239473 A1   Aug. 27, 2015

(30) Foreign Application Priority Data

Oct. 9, 2012   (FR) ..................... 12 02695

(51) Int. Cl.
*B60W 30/165*      (2012.01)
*G05D 1/02*        (2006.01)
(Continued)

(52) U.S. Cl.
CPC ......... *B60W 30/165* (2013.01); *G01D 5/3473* (2013.01); *G01D 5/48* (2013.01);
(Continued)

(58) Field of Classification Search
CPC .............. B60W 30/165; G05D 1/0255; G05D 2201/0209; G05D 1/0227; G01D 5/48; G01D 5/3473
See application file for complete search history.

(56) References Cited

U.S. PATENT DOCUMENTS 5,377,106 A * 12/1994 Drunk ................. G05D 1/0255
                                                  180/169
2006/0229804 A1* 10/2006 Schmidt ............... G05D 1/0278
                                                  701/466
(Continued)

FOREIGN PATENT DOCUMENTS

CN        101337536 A  *  1/2009
DE     10 2010 021 943      12/2011
(Continued)

*Primary Examiner* — Yuen Wong
(74) *Attorney, Agent, or Firm* — Davidson, Davidson & Kappel, LLC (57) ABSTRACT

A guidance system and method is provided which is suitable for guiding a follower vehicle such that it follows a leader. It includes a system for localizing the leader relative to the follower vehicle. At least two distance measuring devices designed to be carried by the follower vehicle are provided, each being suitable for measuring a distance from a reference point of the follower vehicle, associated with the distance measuring device, to the leader. The reference points are spaced apart from one another, and a computer is provided which is, programmed to deduce the position of the leader relative to the follower vehicle from the distances measured by the measuring devices.

10 Claims, 5 Drawing Sheets

(51) Int. Cl.
*G01D 5/347* (2006.01)
*G01D 5/48* (2006.01)

(52) U.S. Cl.
CPC ......... *G05D 1/0227* (2013.01); *G05D 1/0255* (2013.01); *G05D 2201/0209* (2013.01)

(56) References Cited

U.S. PATENT DOCUMENTS

2009/0012666 A1    1/2009  Simpson et al.
2010/0049374 A1*   2/2010  Ferrin .................. G05D 1/0227
                                                    701/1

FOREIGN PATENT DOCUMENTS

DE    10 2010 021942    12/2011
FR         2 707 755     1/1995

\* cited by examiner

VEHICLE GUIDANCE SYSTEM AND CORRESPONDING METHOD

The present invention relates to a guidance system for a follower vehicle, suitable for guiding the follower vehicle such that it follows a leader, of the type comprising a system for localizing the leader relative to the follower vehicle. The invention also relates to a vehicle and a convoy comprising such a guidance system, and a corresponding guidance method.

BACKGROUND

It is common practice, in the civilian field, to use convoys to transport large quantities of material from one point to another in a single journey, without having to make multiple round trips. These convoys are generally made up of a plurality of vehicles that follow one another.

Nevertheless, the establishment of civilian convoys is generally expensive, both in terms of equipment, because a large number of vehicles are necessary to transport the material, and in terms of human resources, since each vehicle must be driven by a driver.

It is also common, in the military field, to have a soldier followed by a moving platform carrying the soldier's equipment. The soldier and his platform thus constitute a convoy, led by the soldier.

Nevertheless, it is desirable for the moving platform to be able to follow the soldier autonomously.

To resolve these problems, it has been considered to robotize the follower vehicles of a convoy. To that end, vehicle guidance systems have been developed.

These guidance systems are suitable for guiding the vehicle that they equip such that it follows a leader, made up of the vehicle preceding said equipped vehicle, or the soldier. To that end, each guidance system generally comprises a system for localizing the leader, suitable for identifying the position of the leader relative to the equipped vehicle, and an automatic driving system for the equipped vehicle based on the position of the leader identified by the localization system.

Different types of localization systems are known. The satellite positioning system (GPS) is one type of non-localization system. This system comprises a GPS beacon carried by the leader. This system is, however, dependent on the reception quality of the GPS signal, which may be scrambled, and requires active communication (radio, optical, etc.) between the leader and the follower.

Localization systems are also known of the vision type, using a daytime and infrared camera, suitable for identifying the leader in the scene filmed by the camera. However, these systems have the drawback of not allowing the leader to be located at all times and under all lighting conditions. These systems also pose problems of following the leader, who must remain in the field of the camera to be able to be localized. Lastly, these systems are expensive.

Localization systems of the goniometer type are also known, which, using a radio beacon carried by the leader and a radio receiver carried by the follower vehicle, make it possible to determine the axis in which the leader is located relative to the follower. However, by not giving the distance from the leader to the follower, these systems only provide partial information on the location of the leader.

Localization systems of the LIDAR type are also known. These systems comprise a LIDAR carried by the follower vehicle, and which makes it possible to locate the leader in a plane, or in space. These systems are, however, expensive.

Lastly, a localization system of the wired sensor type is known from US 2010/0049374. This system comprises a wired sensor carried by the follower vehicle, the wired sensor comprising a cable, attached by one end to the leader, a winder for the cable, and a member for measuring the length of unwound cable. The system further comprises an angle measuring device formed by the cable with the axis of the vehicle. However, environmental parameters, such as the wind speed, can easily vary said angle, leading to an error in the localization of the leader. Furthermore, it is difficult to find angular sensors precise enough to localize the leader precisely.

SUMMARY OF THE INVENTION

It is an object of the present invention to provide a reliable and inexpensive determination of the location of a leader in order to guide a follower vehicle designed to follow said leader. Another aim is to obtain a precise determination of the location of the leader.

The present invention provides a guidance system of the aforementioned type, comprising:

at least two distance measuring devices designed to be carried by the follower vehicle, each being suitable for measuring a distance from a reference point of the follower vehicle, associated with the distance measuring device, to the leader, said reference points being spaced apart from one another, and a computer, programmed to deduce a position of the leader relative to the follower vehicle from the distances measured by the measuring devices.

According to preferred embodiments of the invention, the guidance system also has one or more of the following optional features, considered alone or according to any technically possible combination(s):

the reference points comprise at least two reference points aligned with one another in a plane substantially parallel to a rolling plane of the follower vehicle.

the reference points comprise at least three reference points that are not aligned with one another, there being three distance measuring devices, the computer is programmed to compute a relative speed of the leader with respect to the follower vehicle from the measured distances, it comprises an automatic pilot system for driving the follower vehicle as a function of the position of the leader deduced by the computer, each distance measuring device comprises a wired sensor comprising a cable having an end for connecting to the leader, a return winder for the cable kept stretched, and a member for measuring the length of unwound cable, the computer is programmed to deduce a two-dimensional position of the leader in the rolling plane of the follower vehicle from the measured distances, the computer is programmed to deduce a three-dimensional spatial position of the leader from the measured distances.

The invention also relates to a vehicle comprising a guidance system as defined above, the vehicle being driven as a function of the position of the leader deduced by the computer.

According to another preferred embodiment of the invention, the guidance system also has the following feature, considered alone or according to any technically possible combination(s) with the optional features listed above:

the localization system further comprises a transmitting beacon, designed to be carried by the leader, suitable for transmitting a wave, and each distance measuring device comprises a member for receiving the wave, a chronometer suitable for measuring a duration between a wave transmission moment by the transmitting beacon and a wave reception by the receiving member, and a module, programmed to deduce the distance of the transmitting beacon from the receiving member from the measured duration.

The invention also relates to a convoy comprising a leader, a follower vehicle and a guidance system as defined above, wherein the transmitting beacon is carried by the leader and each distance measuring device is carried by the follower vehicle, the follower vehicle being driven as a function of the position of the leader deduced by the computer.

To conclude, the invention also relates to a method for guiding a follower vehicle, comprising the following successive steps:

measuring a first initial distance between a first reference point of the follower vehicle and a leader, and a second initial distance between a second reference point of the follower vehicle, spaced away from the first reference point, and the leader, deducing an initial position of the leader with respect to the follower vehicle, as a function of the measured initial distances, moving the leader relative to the follower vehicle, measuring a first modified distance between the first reference point and the leader, and a second modified distance between the second reference point and the leader, and deducing a modified position of the leader with respect to the follower vehicle, as a function of the measured modified lengths.

According to other preferred embodiments of the invention, the guidance method also has one or more of the following features, considered alone or according to any technically possible combination(s):

the method comprises a subsequent step for transmitting a movement instruction for the follower vehicle as a function of the deduced initial and modified positions, and the method comprises a prior step for connecting at least two cables to the follower vehicle and the leader, a first of said cables being stretched between the first reference point and the leader and a second of said cables being stretched between the second reference point and the leader, and:

the first initial distance is deduced from the length of the first cable before movement by the leader, and the second initial distance is deduced from the length of the second cable before the movement of the leader, each cable remains stretched during and after the movement of the leader, and the first modified distance is deduced from the length of the first cable after the movement of the leader, and the second modified distance is deduced from the length of the second cable after the movement of the leader.

BRIEF DESCRIPTION OF THE DRAWINGS

Other features and advantages of the invention will appear upon reading the following description, provided solely as an example and done in reference to the appended drawings, in which.

DETAILED DESCRIPTION

Figure 1:
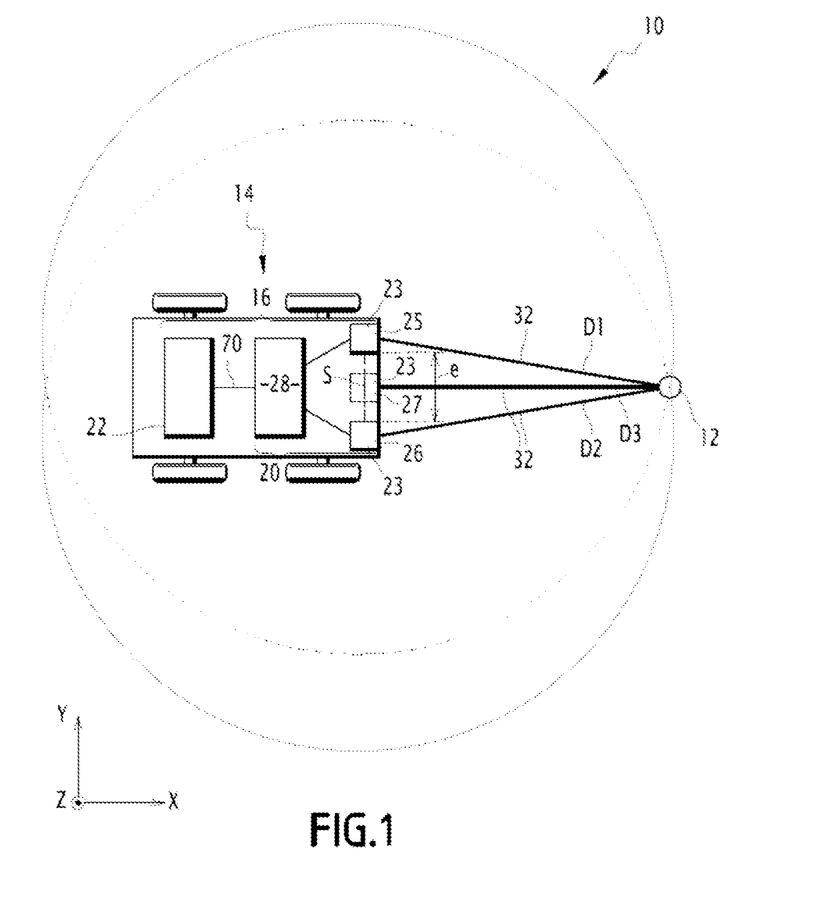
FIG. 1 is a diagrammatic top view of a convoy according to a first embodiment of the invention.
Figure 2:
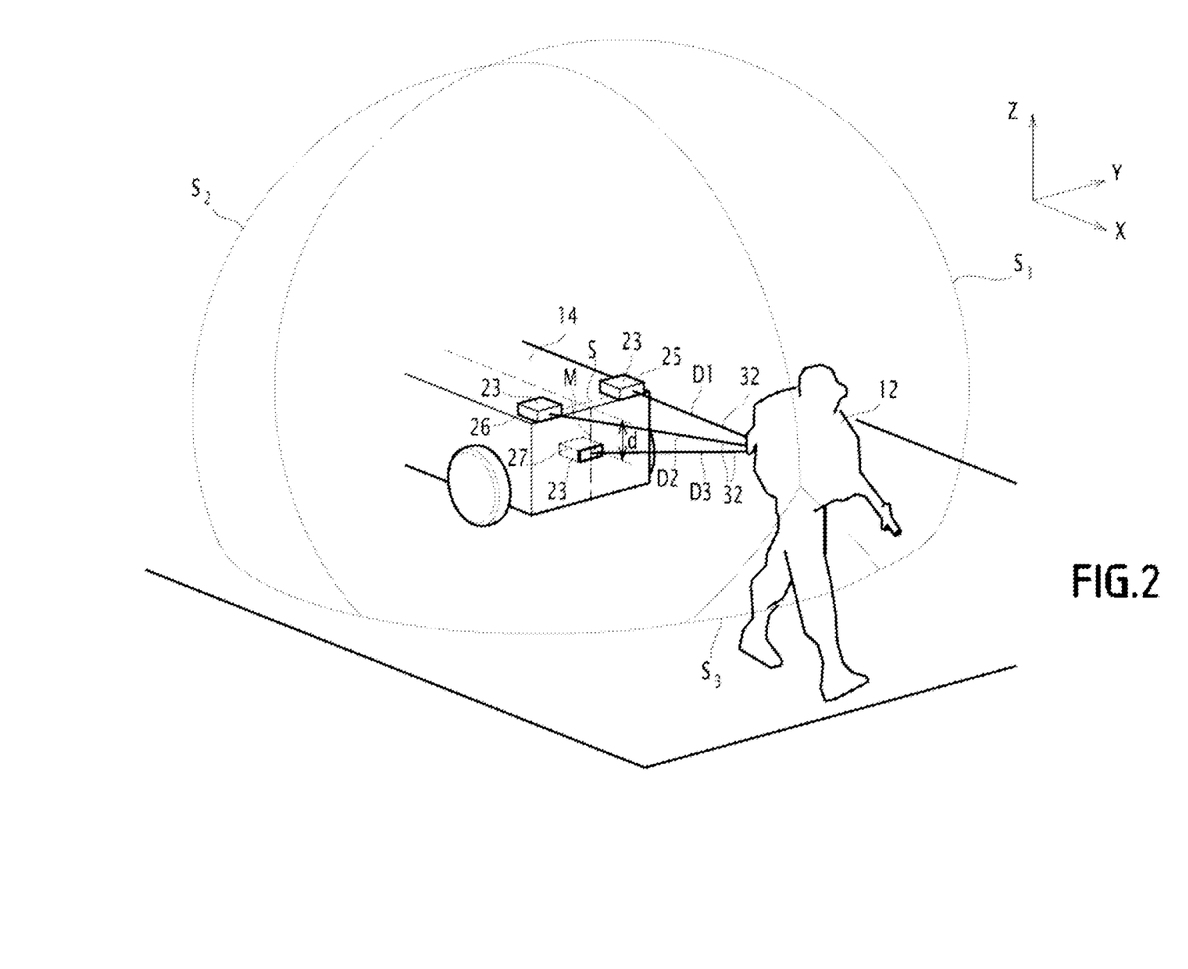
FIG. 2 is a diagrammatic perspective view of the convoy of FIG. 1.
Figure 4:
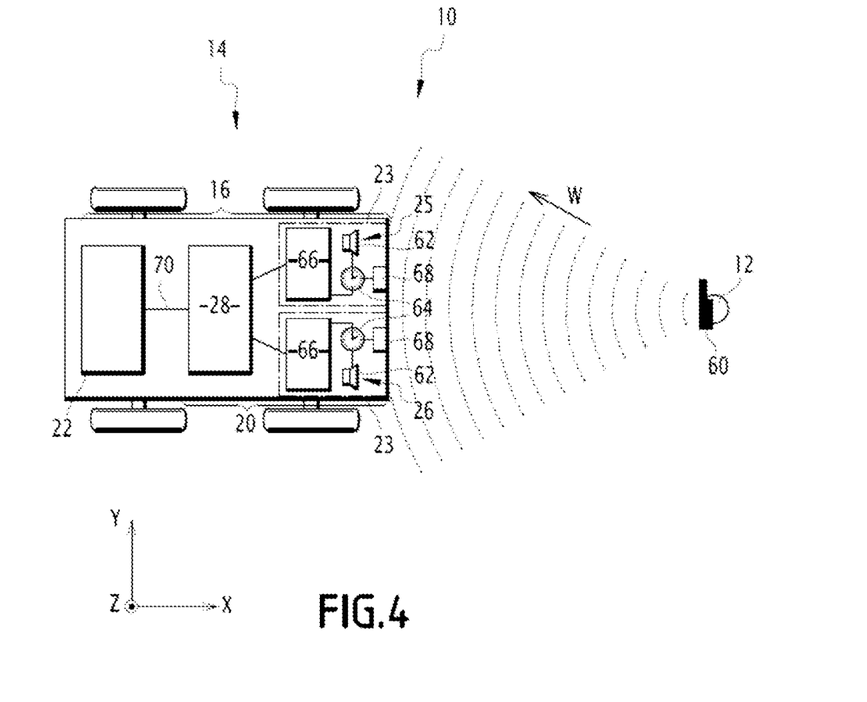
FIG. 4 is a diagrammatic top view of a convoy according to a second embodiment of the invention.

The convoy 10, shown in FIGS. 1, 2 and 4, comprises a leader 12, a follower vehicle 14, and a guidance system 16 for guiding the follower vehicle 14, suitable for guiding the follower vehicle 14 such that it follows the leader 12. In the illustrated example, the convoy 10 is a military convoy.

In the illustrated example, the leader 12 is a soldier. Alternatively, the leader 12 consists of any type of object or person provided with locomotion means, for example a vehicle.

The follower vehicle 14 is a motorized vehicle. In the illustrated example, it is a mobile and motorized transport platform. Alternatively, it is a transport truck.

The orientation terms used below are defined relative to the usual orthonormal reference for vehicles, defined relative to the follower vehicle 14 and shown in FIGS. 1, 2 and 4, and in which one can see:

a longitudinal direction X, oriented from the back to the front of the vehicle 14, a transverse direction Y, oriented from the right to the left of the vehicle 14, and a vertical direction Z, oriented from bottom to top, substantially perpendicular to a rolling plane of the follower vehicle 14, defined by the points of contact of the wheels of the vehicle 14 with the ground.

A horizontal plane is also defined, substantially perpendicular to the vertical direction Z, and therefore parallel to the rolling plane of the vehicle 14.

The guidance system 16 comprises a localization system 20, to determine a position of the leader 12 relative to the follower vehicle 14, and an automatic pilot system 22 for the follower vehicle 14 as a function of the position of the leader 12 determined by the localization system 20.

According to the invention, the localization system 20 comprises at least two distance measuring devices 23, in particular, as illustrated, at least three distance measuring devices 23. Each one is suitable for measuring a distance, respectively D1, D2, D3, of the leader 12 from an associated reference point 25, 26, 27, respectively, of the follower vehicle 14. The localization system 20 also comprises a computer 28, connected to each of the measuring devices 23 and programmed to deduce the position of the leader 12 relative to the follower vehicle 14 from the distances D1, D2, D3 measured by the measuring devices 23.

The reference points 25, 26, 27 are spaced apart from one another. They are preferably, as shown, positioned in a same vertical plane. They are in particular positioned at the front of the follower vehicle 14.

The reference points 25, 26, 27 comprise a first 25 and second 26 reference point horizontally aligned with one another. These reference points 25, 26 are in particular transversely aligned with one another.

The first and second reference points 25, 26 are spaced apart by a space e. As shown, they are preferably positioned along the lateral ends of the follower vehicle 14, so as to maximize the space e.

Preferably, the reference points 25, 26, 27 also comprise, as shown in FIGS. 1 and 2, a third reference point 27 that is not aligned with the first and second reference points 25, 26. It will be noted that although this third reference point 27 has been omitted in FIG. 4 for clarity reasons, the localization system 20 also includes, according to the second embodiment, that third reference point 27.

The third reference point 27 is in particular, as shown in FIG. 2, positioned in a median plane M of the segment S joining the first and second reference points 25, 26. The third reference point 27 is at a distance d from the segment S.

Preferably, each measuring device 23 is positioned, as shown, at the associated reference point 24, 25, 26.

In the first embodiment, each measuring device 23 consists of a wired sensor 30.

Figure 3:
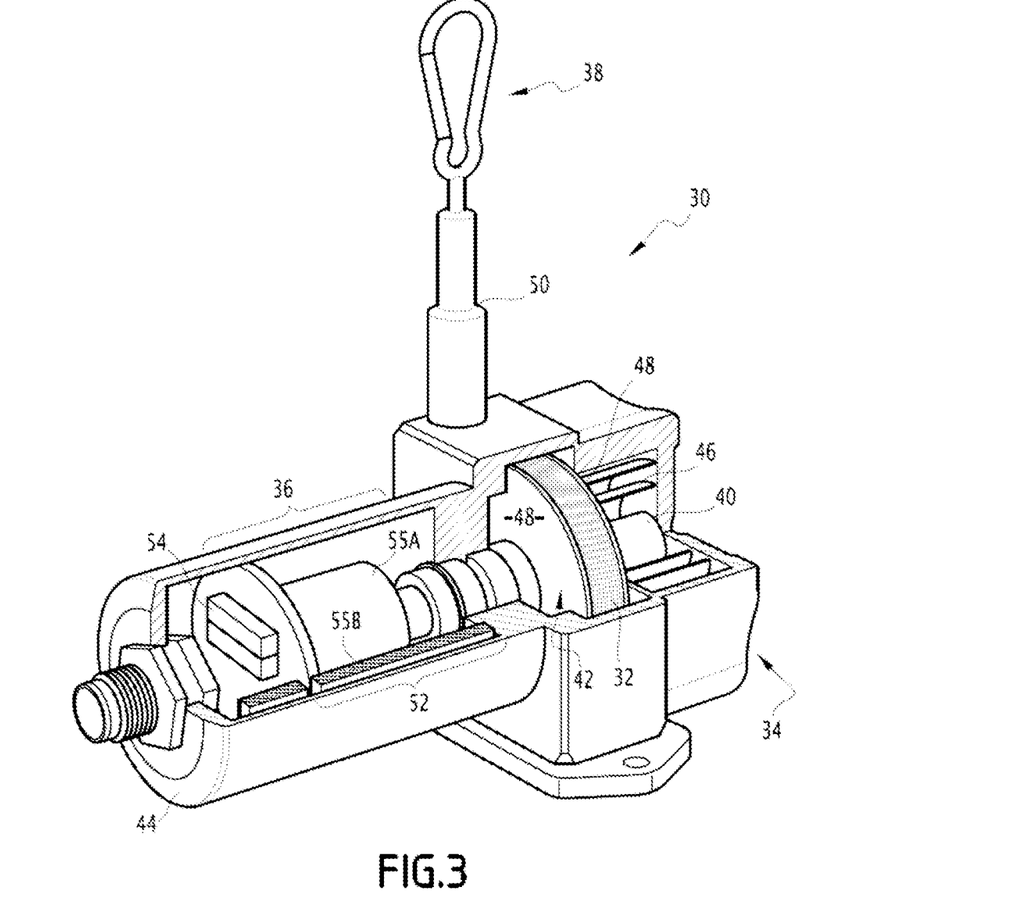
FIG. 3 is a diagrammatic perspective and partial cross-sectional view of a distance measuring device of the localization system equipping the convoy of FIG. 1.

In reference to FIG. 3, each wired sensor 30 comprises, in a known manner, a cable 32, a winder 34 for the cable 32, and a member 36 for measuring the unwound cable length 32.

The cable 32 is designed to withstand a voltage greater than 500 N. It has a diameter preferably smaller than 1 mm. It is typically made up of a nylon or steel wire.

The cable 32 is fastened, by first end (not shown), to the winder 34. Its opposite end forms a connecting end connecting the cables 32 to the leader 12, and to that end bears a fastener 38. In the illustrated example, this fastener 38 is formed by a clipped loop.

The winder 34 comprises a shaft 40 and, secured to the shaft 40, coaxial with the shaft 40, a winding coil 42 of the cable 32. The winder 34 also comprises a housing 44 forming a frame on which the shaft 40 is mounted rotatably around its axis, and a member 46 returning the cable 32 to the position wound on the coil 42.

The shaft 40 is housed in the housing 44. It is supported at its axial ends by the housing 44.

The coil 42 is axially delimited on the shaft 40 by two flanges 48 for guiding the cables 32. The first end of the cable 32 is fastened to the coil 42. The cable 32 is wound around the coil 42 such that, when the cable 32 is unwound, the shaft 40 rotates around its axis in a first direction relative to the housing 44.

The housing 44 has an outlet orifice 50 for the cables 32 outside the housing 44. This orifice 50 has a sufficient diameter to allow the passage of the cable 32, but which is too small to allow the passage of the fastener 38.

The return member 46 is typically made up of a member biasing the shaft 40 in rotation around its axis in a second direction, opposite the first direction, relative to the housing 44. In the illustrated example, this biasing member is a spiral spring fastened to the housing 44 and the shaft 40.

Owing to the return member 46, the cable 32 is kept continuously stretched between the connecting end and the winder 34.

The measuring member 36 comprises a sensor 52, for measuring the number of revolutions of the shaft 40 around its axis and, advantageously, the angular position of the shaft 40. The measuring member 36 also comprises a calculation unit 54, to deduce the length of unwound cable 32 from the number of revolutions and, if applicable, the measured angular position(s), and to determine the distance from the reference point 25, 26, 27 associated with the leader 12 from the unwound length of cable 32.

The sensor 52 is typically an incremental sensor, comprising a rotating part 55A secured to the shaft 40 and a stationary part 55B secured to the housing 44.

Preferably, the measuring member 36 is also suitable for measuring an unwinding and rewinding speed of the cables 32 in the winder 34. To that end, the calculation unit 54 is also suitable for deducing that unwinding and rewinding speed from time variations of the number of revolutions and, if applicable, the measured angular position(s).

This type of measuring device has the advantage of being robust, reliable, inexpensive, and providing a precise distance of the leader 12 from each reference point 25, 26, 27. It is also not very intrusive with respect to the leader 12.

In reference to FIG. 4, in the second embodiment, the localization system 20 further comprises a transmitting beacon 60, carried by the leader 12. This beacon 60 is suitable for transmitting a wave W, designed to be received by each of the measuring devices 23. This wave W is typically an ultrasound wave.

The beacon 60 is also suitable for transmitting an electromagnetic signal (not shown), typically a radio or infrared signal, simultaneously with the wave W.

Each distance measuring device 23 is suitable for measuring the distance D1, D2, D3 from the leader 12 to the associated reference point 25, 26, 27 as a function of the duration of the journey of the wave W from the beacon 60 to said reference point 25, 26, 27.

To that end, each measuring device 23 comprises a member 62 for receiving the wave W, positioned at the associated reference point 25, 26, 27, a chronometer 64, suitable for measuring the duration between a transmission moment of the wave W by the transmitting beacon 60 and a reception moment of the wave W by the receiving member 62, and a module 66, programmed to deduce the distance D1, D2, D3 from the transmitting beacon 60 to the receiving member 62 from the measured duration.

The receiving member 62 typically consists of a microphone.

The module 66 is programmed to deduce the distance D1, D2, D3 from the measured duration using the known propagation speed of the wave W in the air.

Each measuring device 23 also comprises a member 68 for triggering the chronometer 64 during the transmission of the wave W by the beacon 60. This triggering member 68 comprises a device (not shown) for receiving the signal transmitted by the beacon 60, typically a radio antenna or an infrared sensor, and means (not shown) for transmitting a triggering signal for the chronometer 64 when the electromagnetic signal is received.

It will be noted that, in light of the propagation speed of the electromagnetic waves in the air, the signal is received by the triggering member 68 quasi-instantaneously after it is transmitted. Thus, the triggering moment of the chronometer 64 is substantially combined with the transmission moment of the wave W by the beacon 60.

This type of measuring device is reliable, inexpensive and makes it possible to avoid any physical connection between the leader 12 and the follower vehicle 14. It does, however, have the drawback of being intrusive with respect to the leader 12, the latter having to carry a beacon, and requires that the waves and the active signals be transmitted by the leader 12, which, in the case of a military convoy, could cause it to be detected by enemy devices.

In the first and second embodiments, the computer 28 is programmed to resolve the following system of equations:

$$\begin{cases} x^2 + \left(y - \frac{e}{2}\right)^2 + z^2 = D1^2 \\ x^2 + \left(y + \frac{e}{2}\right)^2 + z^2 = D2^2 \\ x^2 + y^2 + (z+d)^2 = D3^2 \end{cases}$$

where x, y and z correspond to the Cartesian coordinates of a point in the orthonormal reference defined above, the reference having the middle of the segment S as origin.

It will be noted that the resolution of the system of equations amounts to identifying the intersection points of the sphere $S_1$, centered on the first reference point 25 and with diameter D1, with the sphere $S_2$, centered on the second reference point 26 and with diameter $D_2$, and with the sphere $S_3$, centered on the third reference point 27 and with diameter D3.

Advantageously, the computer 28 is programmed to take into account a margin of error on each of the measure distances D1, D2, D3 to resolve this system of equations.

This system of equations having two solutions, one with a negative x coordinate and the other with a positive x coordinate, the computer 28 is programmed to use the solution comprising a positive x coordinate as the position of the leader 12 relative to the follower vehicle 14.

Alternatively, when the localization system 20 comprises two measuring devices 23 to measure the distance D1, D2 of each of the first and second reference points 25, 26 from the leader 12, the computer 28 is programmed to resolve the following system of equations:

$$\begin{cases} x^2 + \left(y - \frac{e}{2}\right)^2 = D1^2 \\ x^2 + \left(y + \frac{e}{2}\right)^2 = D2^2 \end{cases}$$

the resolution of this system of equations amounting to identifying the point of intersection of a horizontal circle centered on the first reference point 25 and with diameter D1 with another horizontal circle centered on the second reference point 26 and with diameter D2.

Here again, the computer 28 is programmed to use, as position of the leader 12 relative to the follower vehicle 14, the solution comprising a positive x coordinate. Thus, the computer 28 is programmed to deduce a two-dimensional position of the leader 12 in a horizontal plane from the measured distances D1, D2.

Preferably, the computer 28 is also programmed to compute a relative speed of the leader 12 with respect to the follower vehicle 14. To that end, the computer 28 is for example, in the first embodiment, suitable for deducing that speed from the unwinding and rewinding speeds of the cables 32 of the measuring devices 23 measured by their measuring members 36. Alternatively, the computer 28 is suitable for computing that speed by time derivation of the successive positions deduced by the computer 28.

The computer 28 is also programmed to return error information when it does not manage to resolve the aforementioned equation system.

The computer 28 is connected to the driving system 22 by a digital connection interface 70, designed to send the deduced position and, if applicable, the speed calculated by the computer 28 to the driving system 22. This connection interface 70 typically consists of an Ethernet link, or an ADC bus.

The driving system 22 comprises algorithms, known by one skilled in the art, suitable for generating a movement instruction for the follower vehicle 14 as a function of the position of the leader 12 and, if applicable, the speed of the leader 12, determined by the localization system 20. The driving system 22 is also programmed to stop the follower vehicle 14 when the computer 28 returns error information.

Figure 5:
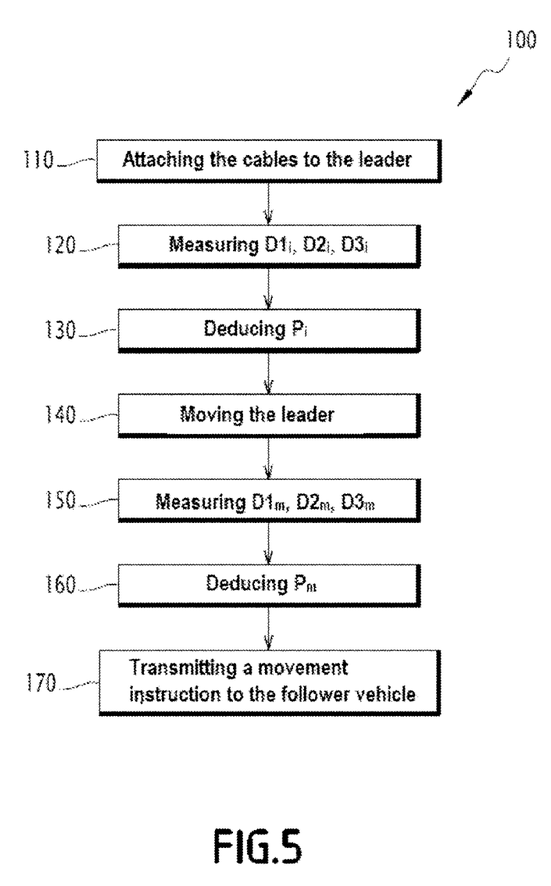
FIG. 5 illustrates a guidance method implemented by a guidance system equipping the convoy of FIG. 1.

A method 100 carried out by the guidance system 16 according to the first embodiment of the invention will now be described, in light of FIG. 5.

During a first step 110, the leader 12 is in an initial position $P_i$ relative to the follower vehicle 14. For each measuring device 23, the cable 32 is then unwound from the winder 34, and attached to the leader 32 by its connecting end. Thus, the cable 32 of a first of the measuring devices 23 is stretched between the first reference point 25 and the leader 12, the cable 32 of a second of the measuring devices 23 is stretched between the second reference point 26 and the leader 12, and the cable 32 of a third of the measuring devices 23 is stretched between the third reference point 27 and the leader 12.

The measuring devices 23 next measure, during a second step 120, a first initial distance $D1_i$ of the leader 12 from the first reference point 25, a second initial distance $D2_i$ of the leader 12 from the second reference point 26, and a third initial distance $D3_i$ of the leader 12 from the third reference point 27. Each initial distance $D1_i$, $D2_i$, $D3_i$, respectively, is in particular deduced from the length of the cable 32 of the measuring device 23 associated with the reference point 25, 26, 27, respectively, which is unwound outside the winder 34. This initial distance $D1_i$, $D2_i$, $D3_i$ is for example equal to the unwound length of cable. Alternatively, a predetermined length is subtracted from the unwound cable length to determine the initial distance $D1_i$, $D2_i$, $D3_i$.

Then, during a third step 130, the computer 28 deduces the initial position $P_i$ of the leader 12 relative to the follower vehicle 14 from the initial distances $D1_i$, $D2_i$, $D3_i$. This initial position $P_i$ is sent to the driving system 22.

During a fourth step 140, the leader 12 moves relative to the follower vehicle 14. It leaves its initial position $P_i$ to occupy a modified position $P_m$.

Then, during a fifth step 150, the measuring devices 23 measure a first modified distance $D1_m$ of the leader 12 from the first reference point 25, a second modified distance $D2_m$ from the leader 12 to the second reference point 26, and a third modified distance $D3_m$ of the leader 12 from the third reference point 27. As in the second step 110, each modified distance $D1_m$, $D2_m$, $D3_m$, respectively, is deduced from the length of the cable 32 of the measuring device 23 associated with the reference point 25, 26, 27, respectively, which is unwound from the winder 34.

Then, during a sixth step 160, the computer 28 deduces the modified position $P_m$ of the leader 12 with respect to the follower vehicle 14 from the modified distances $D1_m$, $D2_m$, $D3_m$. This modified position $P_m$ is sent to the driving system 22.

Lastly, during a seventh step 170, the driving system 22 transmits a movement instruction for the follower vehicle 14 as a function of the initial $P_i$ and modified $P_m$ positions.

Steps 120 to 170 are next repeated, as many times as necessary, until the guidance method 100 ends.

It will be noted that this method 100 is easily adaptable to the second embodiment of the invention.

Owing to the invention described above, it is possible to guide a follower vehicle using a reliable, precise and inexpensive determination of the location of a leader, such that the follower vehicle follows that leader.

What is claimed is:

1. A guidance system for a follower vehicle, suitable for guiding the follower vehicle such that the follower vehicle follows a leader, the guidance system comprising:
    at least two distance measuring devices designed to be carried by the follower vehicle, each being suitable for measuring a distance from a reference point of the follower vehicle, associated with a respective one of the at least two distance measuring devices, to the leader, the reference points being spaced apart from one another; and a computing device, programmed to:
deduce a position of the leader relative to the follower vehicle from the distances measured by the at least two distance measuring devices, and
guide the follower vehicle such that the follower vehicle follows the leader based on the deduced position, wherein each of the at least two distance measuring devices comprises a wired sensor comprising a cable having an end for connecting to the leader, a return winder for the cable kept stretched, and a member for measuring a length of unwound cable.

2. The guidance system as recited in claim 1 wherein the reference points comprise at least two reference points aligned with one another in a plane substantially parallel to a rolling plane of the follower vehicle.

3. The guidance system as recited in claim 1 wherein the reference points comprise at least three reference points that are not aligned with one another, there being three distance measuring devices.

4. The guidance system as recited in claim 1 wherein the computing device is programmed to compute a relative speed of the leader with respect to the follower vehicle from the measured distances.

5. The guidance system as recited in claim 1 further comprising an automatic pilot system for driving the follower vehicle as a function of the position of the leader deduced by the computing device.

6. The guidance system as recited in claim 1 wherein one or more of the at least two distance measuring devices further comprise a transmitting beacon, designed to be carried by the leader, suitable for transmitting a wave, and each distance measuring device comprises a member for receiving the wave, a chronometer suitable for measuring a duration between a wave transmission moment by the transmitting beacon and a wave reception by the receiving member, and wherein the computing device is programmed to deduce the distance of the transmitting beacon from the receiving member from the measured duration.

7. The guidance system as recited in claim 6 wherein the wave is an ultrasound wave.

8. A convoy comprising: the leader, the follower vehicle and the guidance system as recited in claim 6, wherein the transmitting beacon is carried by the leader and each distance measuring device is carried by the follower vehicle, the follower vehicle being driven as a function of the position of the leader deduced by the computing device.

9. A vehicle comprising the guidance system as recited in claim 1, wherein the vehicle is the follower vehicle and is driven as a function of the position of the leader deduced by the computing device.

10. A method for guiding a follower vehicle, comprising:
measuring, with a first measuring device, a first initial distance between a first reference point of the follower vehicle and a leader, and, with a second measuring device, a second initial distance between a second reference point of the follower vehicle, spaced away from the first reference point, and the leader;
deducing, by a computing device, an initial position of the leader with respect to the follower vehicle, as a function of the measured initial distances;
moving the leader relative to the follower vehicle;
measuring, with the first measuring device, a first modified distance between the first reference point and the leader, and, with the second measuring device, a second modified distance between the second reference point and the leader;
deducing, by the computing device, a modified position of the leader with respect to the follower vehicle, as a function of the measured modified distances; and
guiding the follower vehicle such that the follower vehicle follows the leader based on the deduced modified position,
wherein each of the first and second measuring devices includes a wired sensor comprising a cable having an end for connecting to the leader, a return winder for the cable kept stretched, and a member for measuring a length of unwound cable.

* * * * *